(12) United States Patent
Grosso et al.

(10) Patent No.: US 7,193,742 B2
(45) Date of Patent: Mar. 20, 2007

(54) SYSTEMS AND METHODS FOR PRODUCING PORTRAITS

(76) Inventors: John Grosso, 9603 Tresanton Dr., Charlotte, NC (US) 28210; Johnny Grosso, 9603 Tresanton Dr., Charlotte, NC (US) 28210; Garrett Alroy, 9603 Tresanton Dr., Charlotte, NC (US) 28210; John Davis, 4534 Homestead Pl., Matthews, NC (US) 28104

( * ) Notice: Subject to any disclaimer, the term of this patent is extended or adjusted under 35 U.S.C. 154(b) by 813 days.

(21) Appl. No.: 10/339,135

(22) Filed: Jan. 9, 2003

(65) Prior Publication Data
US 2003/0133159 A1 Jul. 17, 2003

Related U.S. Application Data

(60) Provisional application No. 60/347,495, filed on Jan. 11, 2002.

(51) Int. Cl.
*B41B 15/00* (2006.01)
*G03G 15/00* (2006.01)

(52) U.S. Cl. ........................ 358/1.18; 399/85
(58) Field of Classification Search .............. 358/1.18, 358/1.15, 1.9, 1.13, 535, 525; 400/629, 646; 709/203, 217; 399/85, 70, 18
See application file for complete search history.

(56) References Cited

U.S. PATENT DOCUMENTS

| | | | |
|---|---|---|---|
| 4,888,648 A | 12/1989 | Takeuchi et al. | |
| 5,383,027 A | 1/1995 | Harvey et al. | |
| 5,512,396 A | 4/1996 | Hicks | |
| 5,666,215 A | 9/1997 | Fredlund et al. | |
| 5,694,514 A | 12/1997 | Evans et al. | |
| 5,799,219 A | 8/1998 | Moghadam et al. | |
| 5,946,444 A | 8/1999 | Evans et al. | |
| 6,047,130 A | 4/2000 | Oles et al. | |
| 6,154,295 A | 11/2000 | Fredlund et al. | |
| 6,167,469 A * | 12/2000 | Safai et al. ................... 710/62 |
| 6,192,184 B1 | 2/2001 | Shiota et al. | |
| 6,222,637 B1 | 4/2001 | Ito et al. | |
| 6,222,646 B1 | 4/2001 | Maurinus et al. | |
| 6,237,010 B1 | 5/2001 | Hui et al. | |
| 6,317,560 B1 | 11/2001 | Kawabata | |
| 6,353,487 B1 | 3/2002 | Fredlund et al. | |
| 6,784,925 B1 * | 8/2004 | Tomat et al. .......... 348/207.11 |
| 2001/0012112 A1 | 8/2001 | Aoyagi et al. | |
| 2001/0026371 A1 | 10/2001 | Nozaki | |
| 2002/0154327 A1 * | 10/2002 | Jones ........................ 358/1.12 |
| 2004/0070778 A1 * | 4/2004 | Matama ...................... 358/1.9 |
| 2006/0080306 A1 * | 4/2006 | Land et al. ..................... 707/3 |

FOREIGN PATENT DOCUMENTS

EP    0 269 022    6/1998

(Continued)

OTHER PUBLICATIONS

Supplementary European Search Report, Date of Completion of the Search Jun. 10, 2005 for EP Application No. 03729597.9.

*Primary Examiner*—King Y. Poon
*Assistant Examiner*—Saeid Ebrahimi (57) ABSTRACT

A system of producing digital portraits and associated methods are provided. One method includes capturing a plurality of images with a digital recording device and displaying the images in the predetermined groups, such as in groups of two or three images. The customer selects desired images, which can be digitally modified in a variety of ways, and the selected images are electronically transmitted to a digital printer. The digital printer is maintained by an unrelated and distinct third-party host.

18 Claims, 8 Drawing Sheets

FOREIGN PATENT DOCUMENTS

| | | |
|---|---|---|
| EP | 0 930 774 | 7/1999 |
| EP | 1 107 569 | 6/2001 |
| EP | 1 156 453 | 11/2001 |
| WO | WO 99/19811 | 4/1999 |
| WO | WO 00/38101 | 6/2000 |

* cited by examiner

SYSTEMS AND METHODS FOR PRODUCING PORTRAITS

CROSS-REFERENCE TO RELATED APPLICATION

This application claims the benefit of U.S. Provisional Application No. 60/347,495, filed Jan. 11, 2002.

BACKGROUND OF THE INVENTION

Digital imaging technologies are transforming both the amateur and professional photographic markets. Digital imaging components are getting better, faster, cheaper, and are mimicking microprocessor price and power curves. In particular, the overall quality and resolution of digital cameras and images are improving exponentially and have reached conventional photographic quality at competitive retail price levels. Despite the advances in digital technology, many traditional photographic processes rely on silver-halide film systems to develop prints taken using a conventional film camera. This is particularly true in the professional portrait studio industry, which accounts for approximately 25 percent of the United States photographic market. The US professional portrait studio industry is dominated by four portrait companies, which operate thousands of portrait studios using conventional systems and processes described below.

More specifically, conventional photography systems usually incorporate one of a very few number of processes. In one process, a photographer using a traditional film camera takes a limited number of exposures and sends the film to a laboratory without the customer having the opportunity to preview or select any exposures. A laboratory technician prepares a selection of final prints based on speculation as to which prints the customer will most likely purchase. The final prints are then sent to the photography studio, and the customer purchases prints from the preselected final prints.

In another process, a limited number of photographs are taken, and the exposed film is sent to a laboratory for development, which can take several weeks. Proofs are then returned to the customer or photography studio, whereby the customer selects the desired prints and may or may not provide additional instructions concerning corrections to the selected prints. The final prints are then made at the laboratory and sent to the customer.

In yet another process, a video camera is used to mimic the exposures taken with the film camera. The customer is able to preview the video camera recordings, which are close representations of the film exposures. The customer makes initial purchasing decisions based on the video preview, and the film is sent to the laboratory for development. The remainder of the process is similar to the processes described above. The preview method is advantageous in that the customer is allowed to see a somewhat similar view of the exposures taken during the photography session. However, the preview shots or exposures are only representations of the actual exposures, and the customer still has to wait several weeks for the film to be processed before receiving the final prints. And in addition to the delay in obtaining the final prints, backgrounds and customization features are limited to the number of backdrops and developing features provided by the studio and laboratory.

In yet another system, a digital camera is used to capture one image at a time, whereby the customer can view the image as soon as it is taken and either 1) approve the image and move to the next portrait setting, or 2) disapprove the image and take another image until satisfied. The approved images are then sent to a traditional printing facility and the customer must wait several weeks for the prints. Other types of printing could be used as well.

Some photography systems utilize digital technology to enhance traditional film prints or to correct defects therein. Many of these systems, however, simply create a digital image taken from a traditional film print, which is wasteful and loses resolution in converting the film image to a digital image. In some cases the digital image can be customized with borders or the like, but the customer's selection is limited to a small number of images taken using the traditional film camera. Thus, there is a need to provide a photography system and related methods, and more particularly a portrait system and related methods, whereby the customer can select from a wide range of images, and whereby the customer can customize the images and receive final prints quickly and efficiently. There is also a need to provide methods of ordering and selecting portrait images that reduce cycle time and provide the customer with precise information regarding how the final prints will look.

BRIEF SUMMARY OF THE INVENTION

These and other needs are provided by the present invention, which relates to a digital imaging portrait studio system and methods for producing and selecting digital images. Advantageously, the portrait studio system of the present invention uses digital images and digital printers to produce final prints quickly and efficiently. In addition, the portrait studio system of the present invention allows the customer to select prints from a large number of images using a variety of backgrounds and customization features. In addition to prints, the present invention includes systems and methods for producing other products as well, such as internet-accessible images and other electronically-generated images.

In particular, the present invention includes several advantageous methods of producing, selecting, and ordering portraits from digital images. One such method includes capturing a plurality of digital images, such as at least ten, with a digital recording device. Digital recording devices, such as digital cameras and digital video cameras, are capable of storing many images and storing the images in an internal storage device or a removable storage medium, such as a disk or card. The method also includes displaying the images in groups of at least two or more and selecting at least one image for purchase. The selected image is then electronically transmitted to a digital printer for printing. In one embodiment, the digital printer is owned and/or operated by a first party, while in another embodiment the digital printer is owned and/or operated by an unrelated and distinct third party or separate host. This arrangement is particularly advantageous where the digital printer is already in use, such as in a retail outlet, and is used to process third party customers' film prints that are brought in for developing. According to the present invention, the captured digital images are merely transmitted to the digital printer, which increases the frequency and cost-effectiveness of the digital printer while obviating the need for a dedicated portraits-only studio digital printer. Other embodiments, however, incorporate a digital printer that is owned and/or operated by the same party.

The present invention also includes several methods relating to producing and ordering portraits. One method of viewing digital portrait images includes capturing a plurality of images of a subject with a digital camera and transferring the images to a computer. Advantageously, all of the images are then displayed on a screen such that the images can be compared, and then selected images are grouped according to background setting or the like. Each group and the corresponding images contained therein are then displayed on the screen so that the customer can choose from images having similar backgrounds or the like. In this regard, the photographer can take multiple candid images without having to disrupt the flow of the portrait session to review each image, and the image grouping step greatly simplifies the process of selecting the best images from the entire portrait session.

During the selection process the desired images can be highlighted or visually differentiated from the undesired images, such as by changing the borders of the images or the like. In one embodiment, the undesired/unselected images remain on the screen, albeit with visual differentiation, so that the customer has the opportunity to change his/her mind and select the image at a later time. When the desired images are selected, they are added to an electronic shopping cart or similar device.

Advantageously, the present invention also includes methods of adding special effects to selected images, which heretofore has been impossible or prohibitively time-consuming and costly. Specifically, one method includes displaying a plurality of images on a screen along with special effects, such as soft vignette borders, black and white, multiple cameos, and double exposure. The images are then selected for a corresponding special effect, and the modified image (having the special effect setting applied thereto) is saved.

The present invention also includes a system for producing digital portraits that includes a digital recording device, such as a digital camera, for capturing a plurality of images in a professional portrait studio of a first party, and a digital printing device that is operated by a second party at a retail location thereof. The recording device and printer are operatively connected to one another, yet are owned and/or operated by different parties. This type of arrangement allows for the first party to utilize the printer of the second party, and thus increase the productivity of the printer and the second party, yet eliminate the need for a dedicated printer that is owned by the first party.

Accordingly, the systems and methods of the present invention offer entirely new approaches to the portrait industry. By utilizing digital technologies in both image capturing, printing, and portrait purchase, the present invention provides a substantial improvement in the state of the art.

BRIEF DESCRIPTION OF THE FIGURES

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
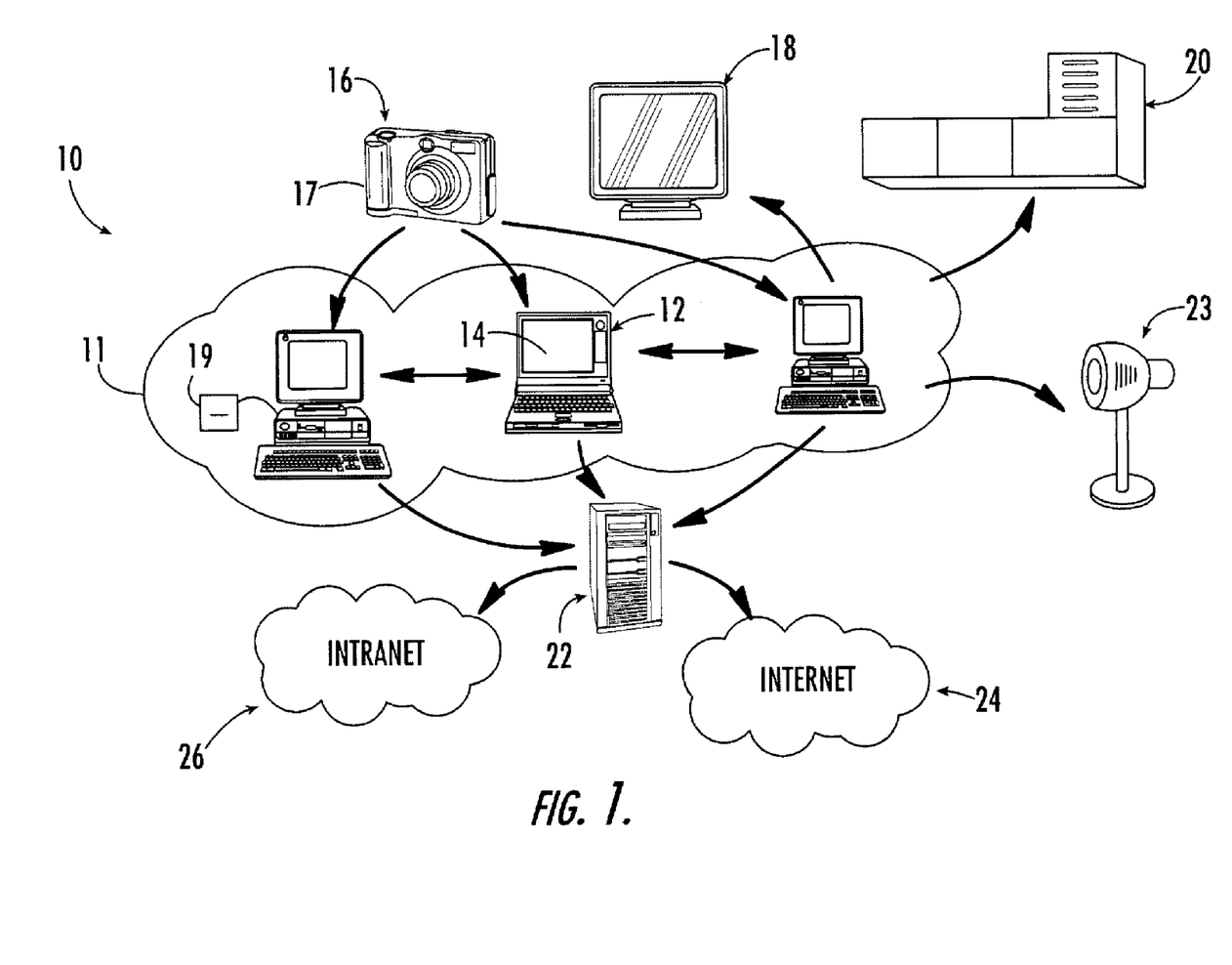
FIG. 1 is a schematic diagram of a digital portraiture system according to one embodiment of the present invention.

Turning to the figures, FIG. 1 shows a schematic or relationship diagram of a digital portrait studio system 10 according to the present invention. In particular, the system 10 includes a local area network (LAN) 11 that is operated in a portrait studio or the like. The LAN operatively connects a plurality of computers 12. At least one of the studio computers 12 includes studio relational databases, such as customer appointments, customer resource management information, photography and sales, studio administration, print production, and internet/intranet information. Such information can be displayed on a display screen 14 of one or more of the computers 12 or on a separate or independent display screen 18. The LAN 11 is operatively connected to the internet 24 and/or an intranet system 26 through an output device 22, such as a modem or the like.

The system 10 also includes at least one digital recording device 16. In one embodiment, the digital recording device 16 is a digital still-frame camera, such as a Fujifilm® FinePix S2 Pro Digital Camera™ or Kodak® Professional DSC 760 Digital Camera™ that feature a Nikon® F5 body. Other digital cameras could be used instead that provide similar performance. Digital images are captured and stored on a reusable memory or "PC" card 17 as opposed to standard professional film. The camera 16 can also be hard wired or tethered to one of the computers 12. The camera 16 preferably is capable of at least 6 megapixel resolution (e.g., 3032×2008 or 3024×2016) and can shoot at speed of up to about 1.5 frames/second or more. Because the camera 16 is digital, the cost per exposure is negligible, and therefore the photographer is able to take an unlimited number of digital images during a photo session without encountering substantial cost. In a preferred embodiment, the memory card 17 has a storage capacity to store a relatively large number of high-resolution images, such as at least 256 MB.

The system 10 also utilizes a digital minilab printer 20, such as a Fujifilm® Digital Minilab Frontier System™. Preferably, the digital minilab printer 20 is a pre-existing, stand-alone unit that is owned and operated by an unrelated and distinct party, such as a retailer host that is associated with the studio portion of the system 10 of the present invention. As such, the system 10 of the present invention simply uses a portion of the extra capacity of (or "piggy backs" on) the other party's minilab printer 20 through the studio LAN to deliver print requests, which are accepted by the minilab printer and processed accordingly. As such, the productivity of the retailer's printing equipment and equipment operators are greatly enhanced by adding the print volume of the digital studio system 10 of the present invention to the retailer's preexisting print volume.

Further, the minilab printer 20 is preferably in the same general location as the studio system 10 of the present invention such that final prints can be obtained quickly and efficiently. Due to the speed of the digital printer 20 and the preferably close proximity of the printer to the studio, customers can order and receive the final prints shortly after the photography session, such as in about one hour, instead of waiting several weeks as in traditional processing systems.

The studio system 10 of the present invention includes digital processing equipment, including processing software and dedicated computers, whereby each digital image can be transformed into a plurality of variations using user-friendly menus and tools. For example, the processing software includes code that provides for modifying each digital image, including digitally "retouching" portions of the image, cropping and centering, combining the image with other images in a combination image, changing the size of the image and final print, adding graphics or text, changing the tone or finish of the image, changing the background, creating a collage, creating vignettes of various colors, and so on. Advantageously the processing software allows for all these finishes and customizations without the need of outside software or applications. A display, such as the computer monitor display 14 or the display screen 18, displays the digital images before and after any changes are made by the customer, and the final images are saved by at least one of the studio computers 12 in the LAN 11. Thus, the customer is able to take an image and create an entirely different image with an entirely different look and feel from the original image. Multiple unique and customized images can also be created from a single original image, which provides value and convenience for the customer.

In addition to providing systems and methods, the present invention also provides computer program products for carrying out the steps and features described herein. The computer program products have a computer readable storage medium having a computer readable program code means embodied in the medium. The computer readable storage medium may be part of a memory device, such as the computer 12, any may implement the computer readable program code means to carry out the steps and features of the various embodiments as described herein.

Methods of producing digital portraits are included as well. Generally, a customer makes an appointment for a photography or portrait sitting, which is entered into an appointment system by a studio operator. The portrait sitting is completed at the predetermined appointment time, and the customer purchases selected prints and/or print packages. The final prints are ready for pick-up in approximately one hour using the printer of the on-site retailer or some other location.

Figure 2:
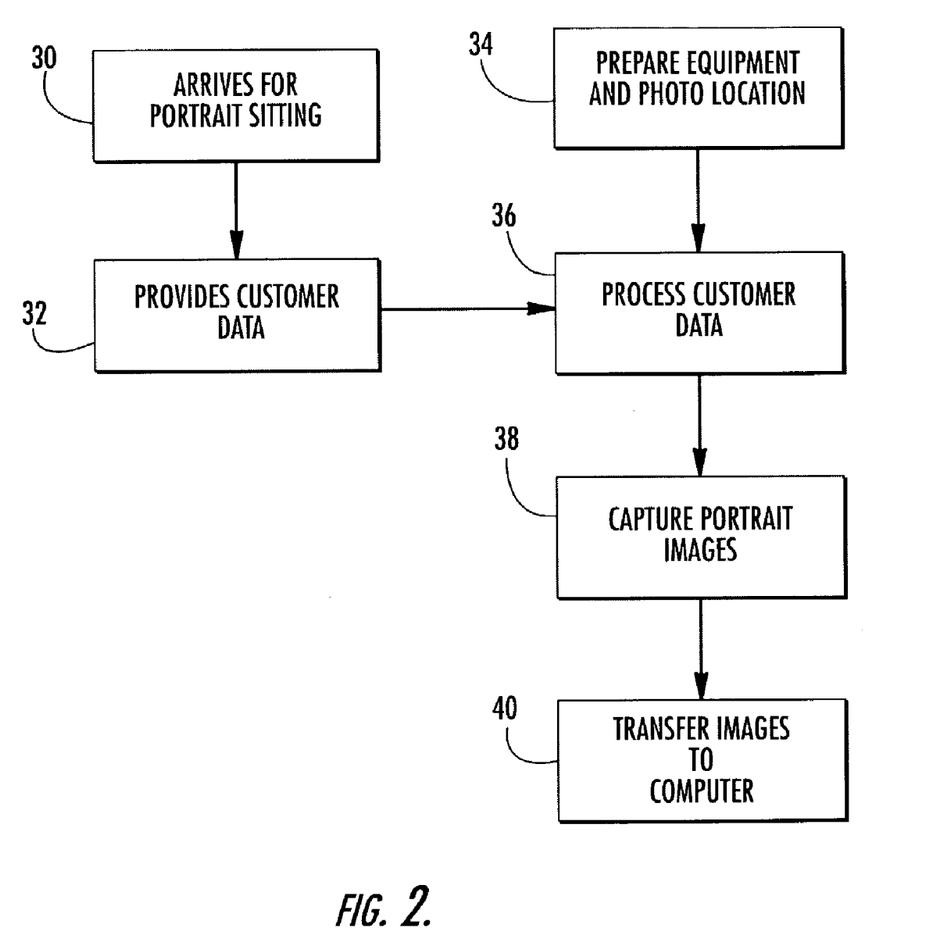
FIG. 2 is a flow diagram describing a portion of a method of producing portraits according to the present invention.

FIG. 2 shows a more detailed portrait session process according to one embodiment of the present invention. In particular, when the customer arrives at the predetermined photography sitting appointment 30, the studio operator prepares the digital camera(s) and camera room 34. The customer is then interviewed by the studio operator to gather information specific to that customer, such as names, address, birth dates, types of desired photos, etc. 32, 36, although the interview can be performed after the images are captured. The studio operator or photographer then captures a variety of digital images with the camera 16. The portrait sitting according to the present invention is much more detailed compared to conventional film sittings. More specifically, the studio operator takes about 36 digital images or more on a plurality of backgrounds, such as four. In one embodiment, the studio operator takes a predetermined number of exposures at predetermined zoom levels, such as one image at close range, one image at mid range, and one image at a long range. The imaging sequence can be used for a predetermined number of poses, such as about 3 or more. The images stored on the camera 16 are then transferred to a studio computer 12 for editing and selection by the studio operator and/or the customer 40. In particular, the image transfer and retrieval is preferably performed by the studio operator, who uses a studio computer 12 to get the images from the camera's memory card 17.

Figure 3:
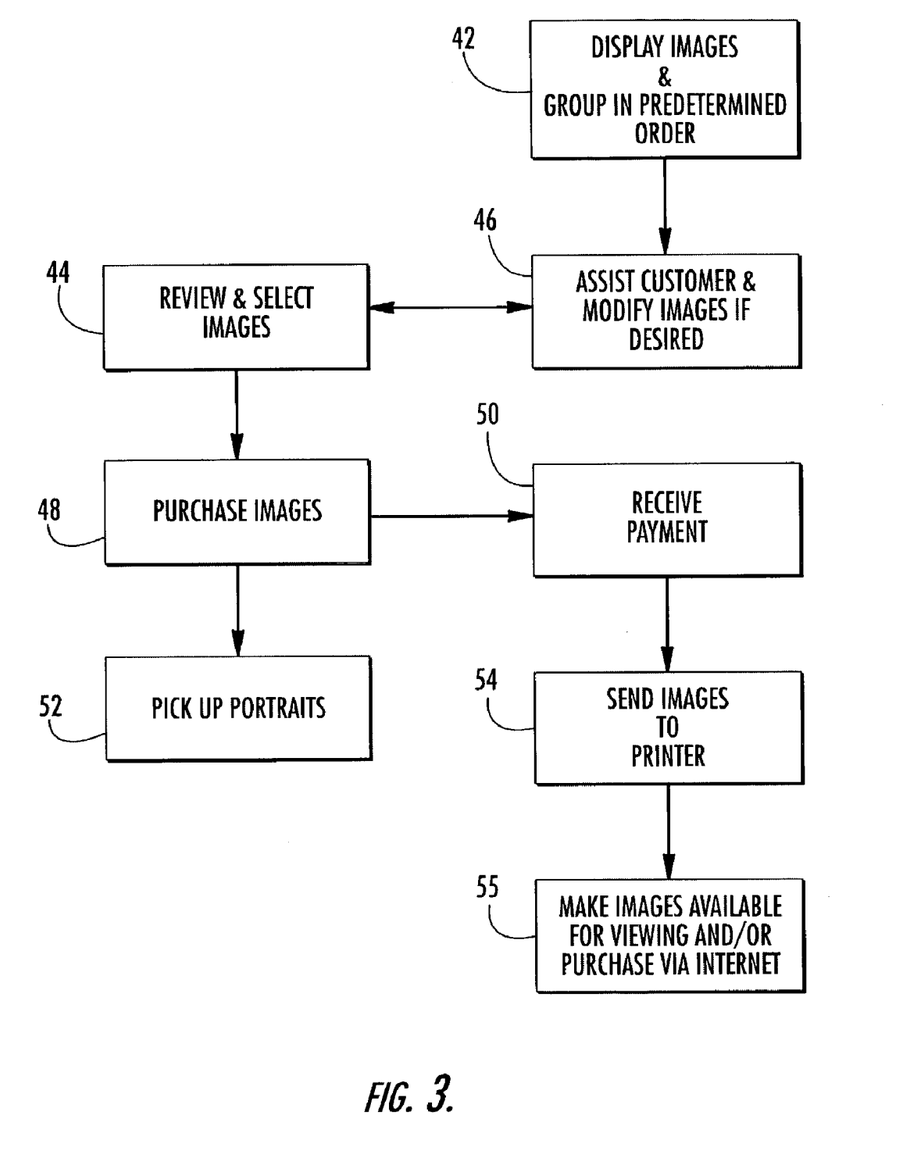
FIG. 3 is a flow diagram describing another portion of a method of producing portraits according to the present invention.

FIG. 3 shows the next steps in the portrait selection process according to one embodiment of the present invention. In particular, after the digital images are transferred from the camera 16 to the studio computer 12, the studio operator retrieves and displays the images 42 on the screen 14. Preferably, the image retrieval action includes displaying a list of customers to which the images can be assigned, such as a list of customers who have made appointments that day. When the correct customer information is matched with the images, all of the captured images are displayed so that the customer can compare all the images from the sitting.

The images are then grouped so that the customer has a plurality of images to choose from, yet in a more manageable fashion 44. For example, when 36 images are taken, the images can be grouped in sets of 2, and preferably 3, and the customer is allowed to choose one or more favorites from each set with assistance from the studio operator 46. After the customer has selected a group of favorite images, including any customization features and the like, the customer purchases the images 48, which may include special pricing packages and the like, and the studio operator receives the payment 50. The images are then sent to the printer 54, which in one embodiment is owned and maintained by an unrelated and distinct party, such as a warehouse shopping club retail store. The customer can then pick up the portraits 52 from the printer in a quick and convenient manner, such as during the course of shopping in the retail store of the third party. During these steps, sales data and the like can be transmitted from the LAN 11 through the internet 24 and intranet 26 to various websites and internal databases. In particular, in one embodiment the images can be made available for viewing and purchase via the internet 55.

FIGS. 4–7 provide a more detailed look into the methods according to the present invention. FIGS. 4–7 illustrate sample screen shots or views of a display screen 14, 18 of a computer 12 or operatively connected thereto. In particular, after the digital images have been captured of the subject, the session continues by loading the images 62 from the memory card 17 or other form of stored data and, during this time, the images are individually shown on the screen 14 during the download to give the customer a preview of what is to come. Transfer of the image data could be performed a number of ways, such as using wireless technologies, USB, or the like.

Figure 4:
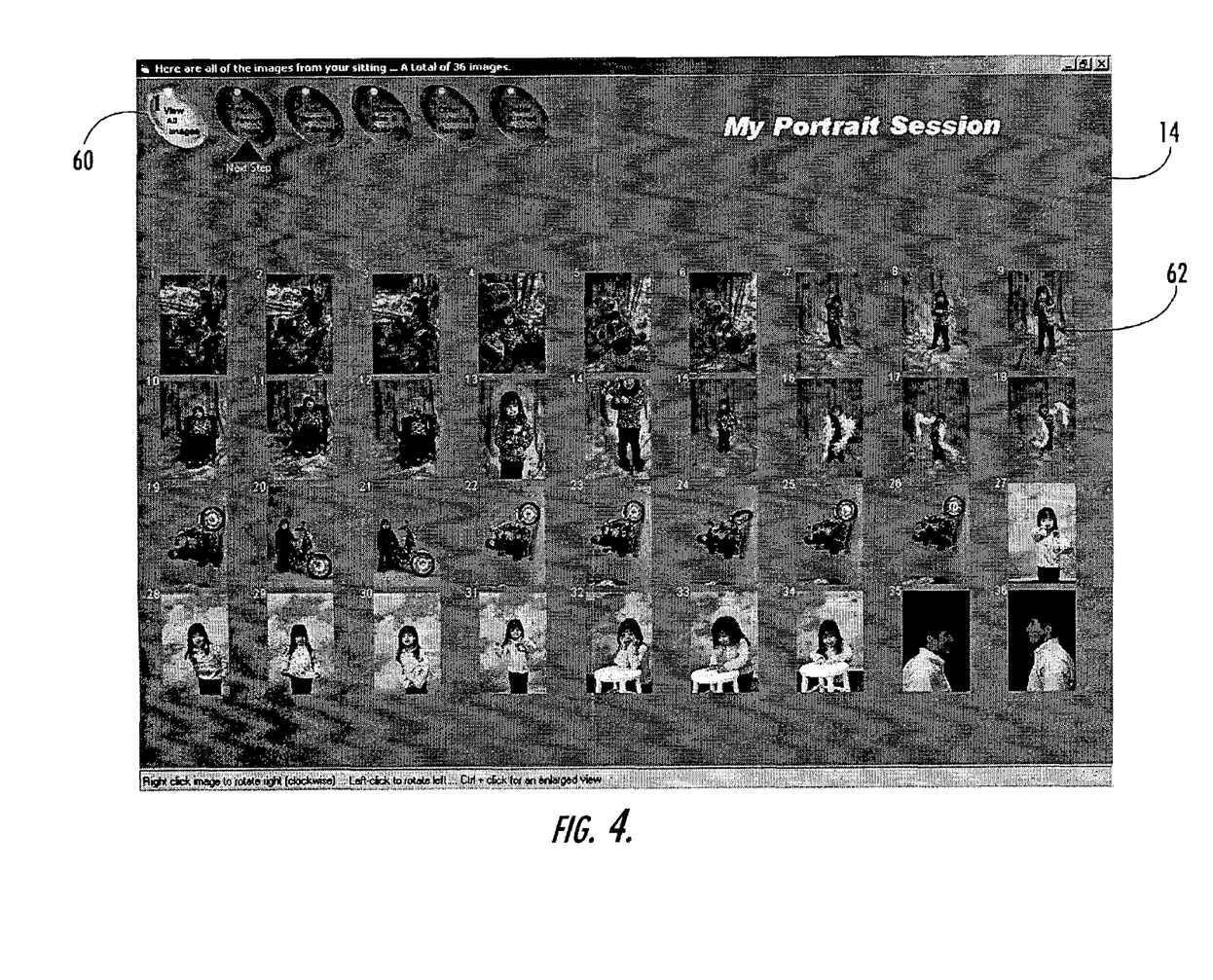
FIG. 4 is a display screen image displayed during a method of producing portraits according to the present invention.

In one embodiment, a location map 60 is provided in order to provide the customer with easy-to-follow guidelines during the session. The location map 60 may include selectable icons, such as viewing all images, picking favorite pose, adding special effects, choosing size and quantity, selecting other products and services, and ordering portraits. As shown in FIG. 4, the first icon entitled "View All Images" is highlighted to indicate the current screen.

According to the present invention, the system 10 includes software having instruction code for dividing the images into predetermined groups. The groups can be based on sequential order, pose, background, and the like, or may be customized according to particular preferences of the studio operator or customer.

In one embodiment, the 36 images captured during the portrait session feature 4 different backgrounds and 12 poses. These numbers can vary higher or lower depending on the speed, detail, and service offered by the particular studio. The images are divided into groups of at least 2 and preferably 3 images whereby the customer in future steps can select one of the three poses that the customer likes best.

Figure 5:
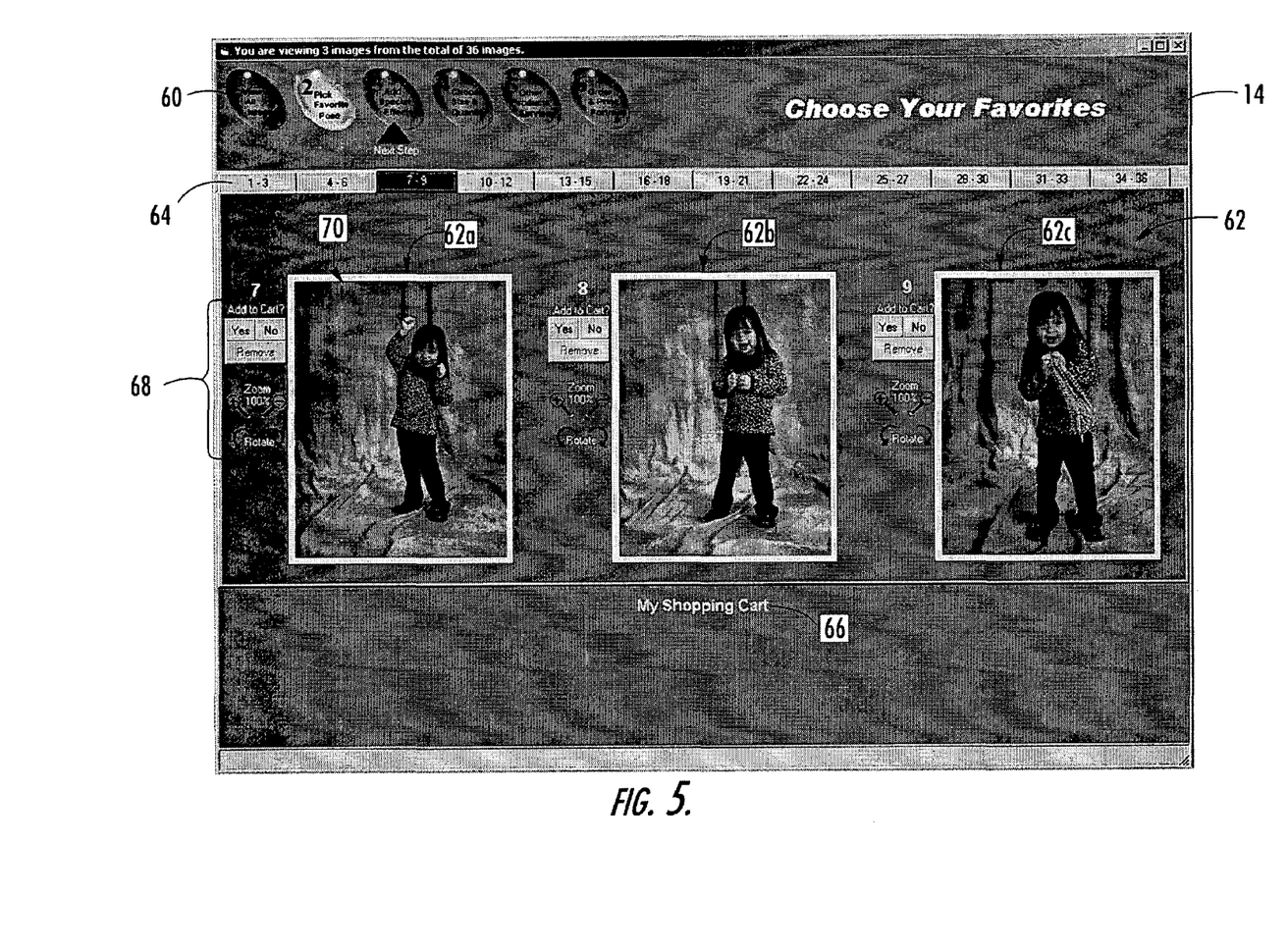
FIG. 5 is another display screen image displayed during a method of producing portraits according to the present invention.

FIG. 5 illustrates the next step in the portrait session. Upon clicking the second icon on the location map 60 when viewing the screen shown in FIG. 4, a new screen is shown whereby the second icon entitled "Pick Favorite Pose" is now illuminated. As described above, the images are grouped in a predetermined fashion and displayed so the customer can select his or her favorite image from a plurality of images having similar poses, background, or other attribute(s). In FIG. 5, the group shown includes sequential images 62a, 62b, and 62c of the portrait session. Above the three images 62a, 62b, and 62c is a line of tabs 64 indicating the image numbers in each grouping. For example, for images 62a, 62b, and 62c as shown, the tab 7–9 is selected. Adjacent tabs include 1–3, 4–6, 10–12 . . . and 34–36.

Several selection and editing controls 68 are positioned next to each image. In one embodiment, below the image number 62a, 62b, and 62c is the text "Add To Cart?" with "Yes" and "No" buttons for the customer to choose or not choose the image to add to an electronic shopping cart 66. A "Remove" button is also included in case the customer changes his or her mind about the particular image and wishes to re-select the image for the shopping cart. Zoom features are also included along with rotational tools so that the image can be positioned and magnified to a desired level. Surrounding each image is a border 70, which can change in color or appearance depending on the status of the particular image. Another feature available for each image is a positioning feature that allows the image to be centered or otherwise positioned, as the customer desires. During the repositioning of the image, the border 70 turns blue and the image is moved by positioning the cursor over the image and moving the cursor while holding down the left mouse button or a key on the keyboard or the like.

Figure 6:
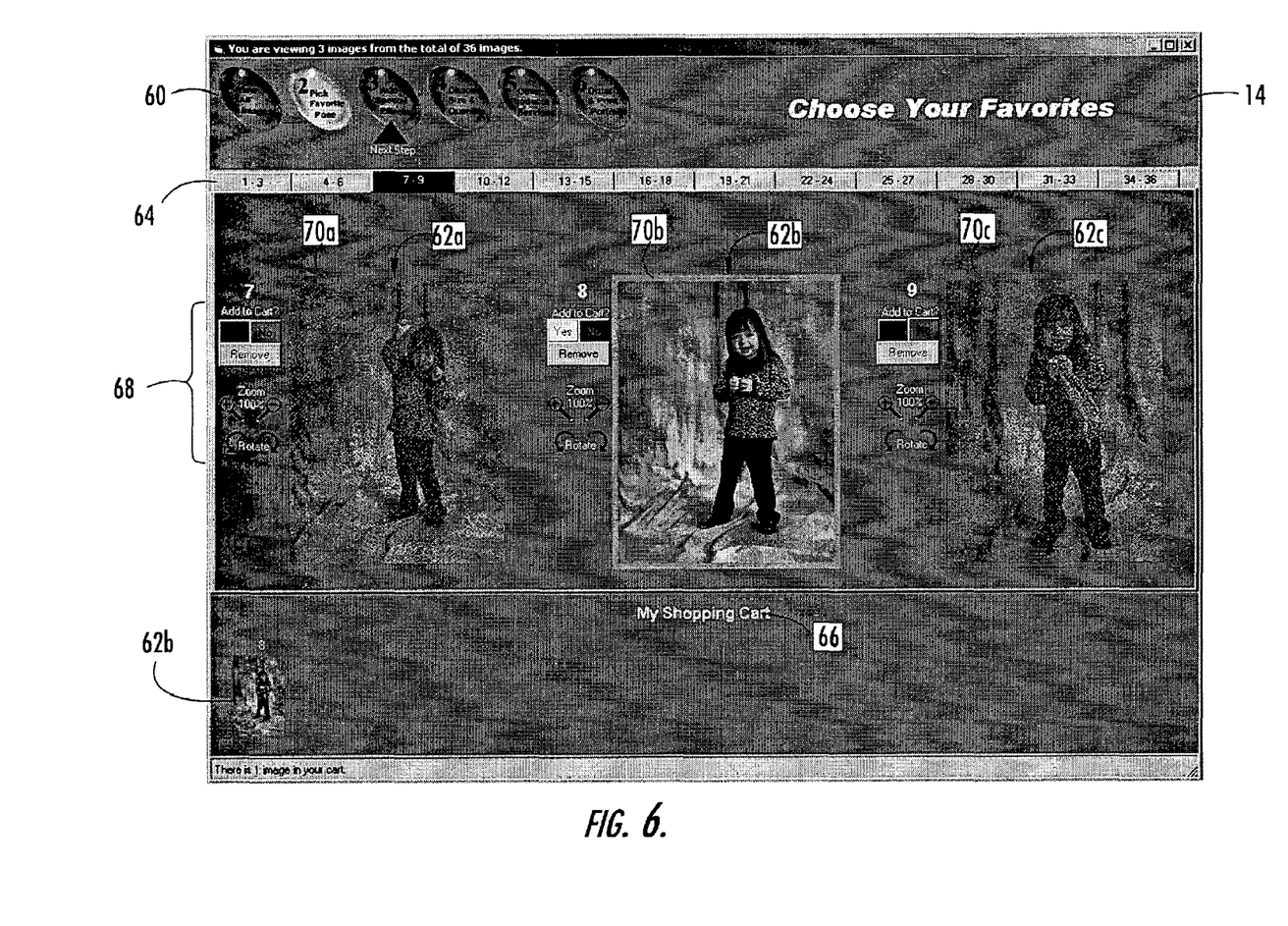
FIG. 6 is yet another display screen image displayed during a method of producing portraits according to the present invention.

FIG. 6 illustrates the appearance of the screen 14 after one of the images 62a, 62b, and 62c has been selected from the screen shown in FIG. 5. In particular, selecting a particular image, for example image 62b, changes the border from a first color to a second color, for example yellow to green. In a preferred embodiment, the remaining two images 62a, 62c on the screen 14 are by default considered unselected or discarded, and the colored border around each unselected image turns red and the image is shaded or otherwise indicated as unselected. A copy of the selected image 62b is then transferred to the lower portion of the screen to the electronic shopping cart 66 that contains a copy of all the selected images. If the customer desires more than one of the three images in the group, or if the customer does not want any of the particular images in the group, each image can be added or removed by override from the shopping cart 66. It should be noted that the images 62a, 62b, and 62c are shown at a reduced resolution of the actual image, such as about one-quarter resolution, which does not substantially affect the image quality, but allow for fast editing and the like.

Once the desired images are selected from the particular group, the studio operator/user or customer selects another tab 64 indicating another group, e.g., images 4–6, and the process is repeated until all of the images have been viewed and the desired images have been selected and added to the shopping cart 66.

Figure 7A:
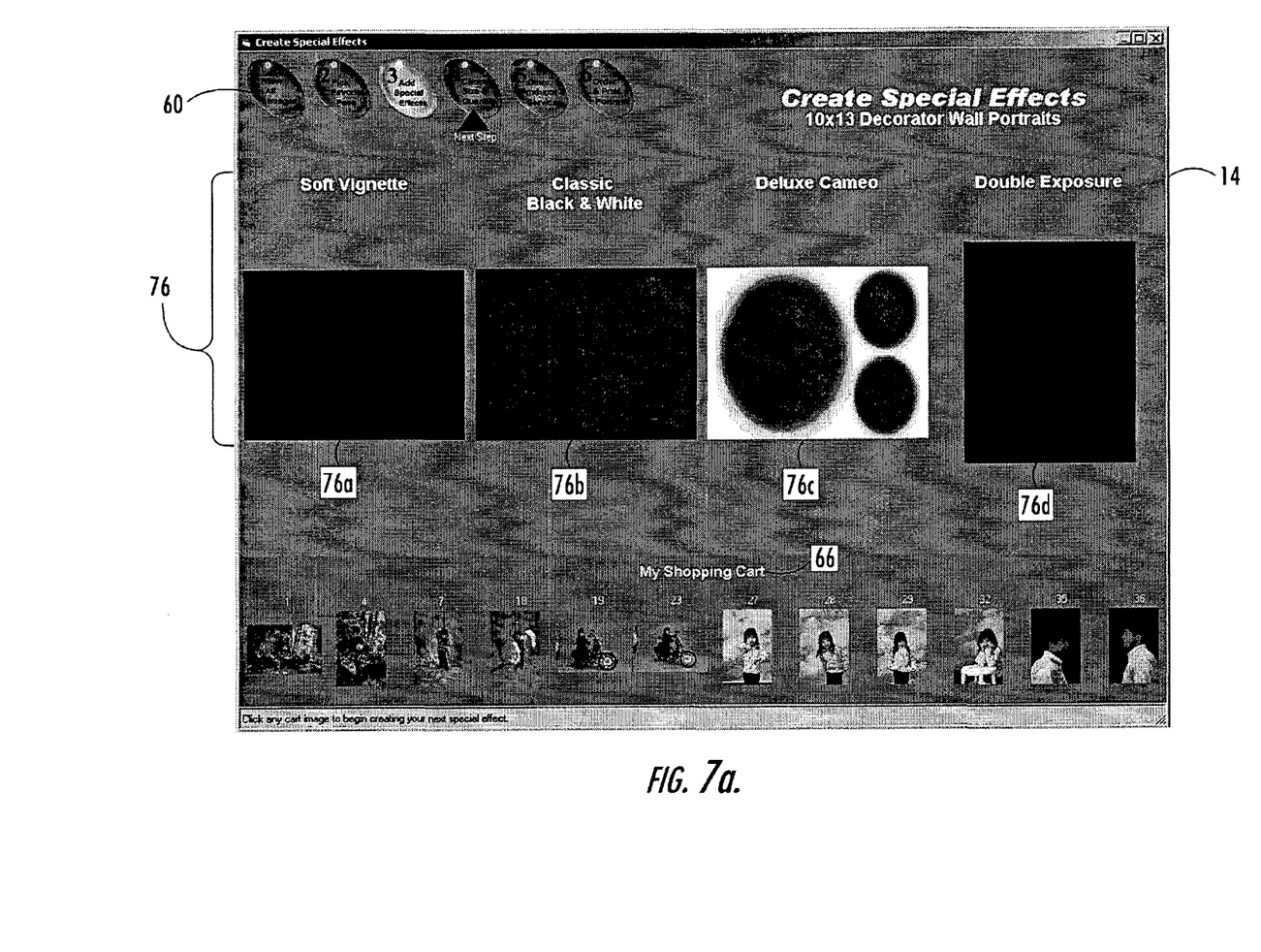
FIGS. 7a and 7b are yet other display screen images displayed during a method of producing portraits according to the present invention

FIGS. 7a–7c illustrate another step of the portrait session according to one embodiment of the present invention. As shown in FIG. 7a, several special effect settings 76 are arranged on the display screen 14 along with the electronic shopping cart 66 so that the customer can select particular images in which to apply the special effects, if desired. For example, special effect settings may include, but are not limited to, soft vignette 76a, classic black and white 76b, single or multiple cameo 76c, and double exposure 76d. In one embodiment, the desired image(s) for a particular special effect setting 76 is selected by clicking the desired image in the shopping cart 66, which advantageously automatically transfers a copy of the image into the setting. The image can also be modified as described above after the image was been transferred to the setting.

Figure 7B:
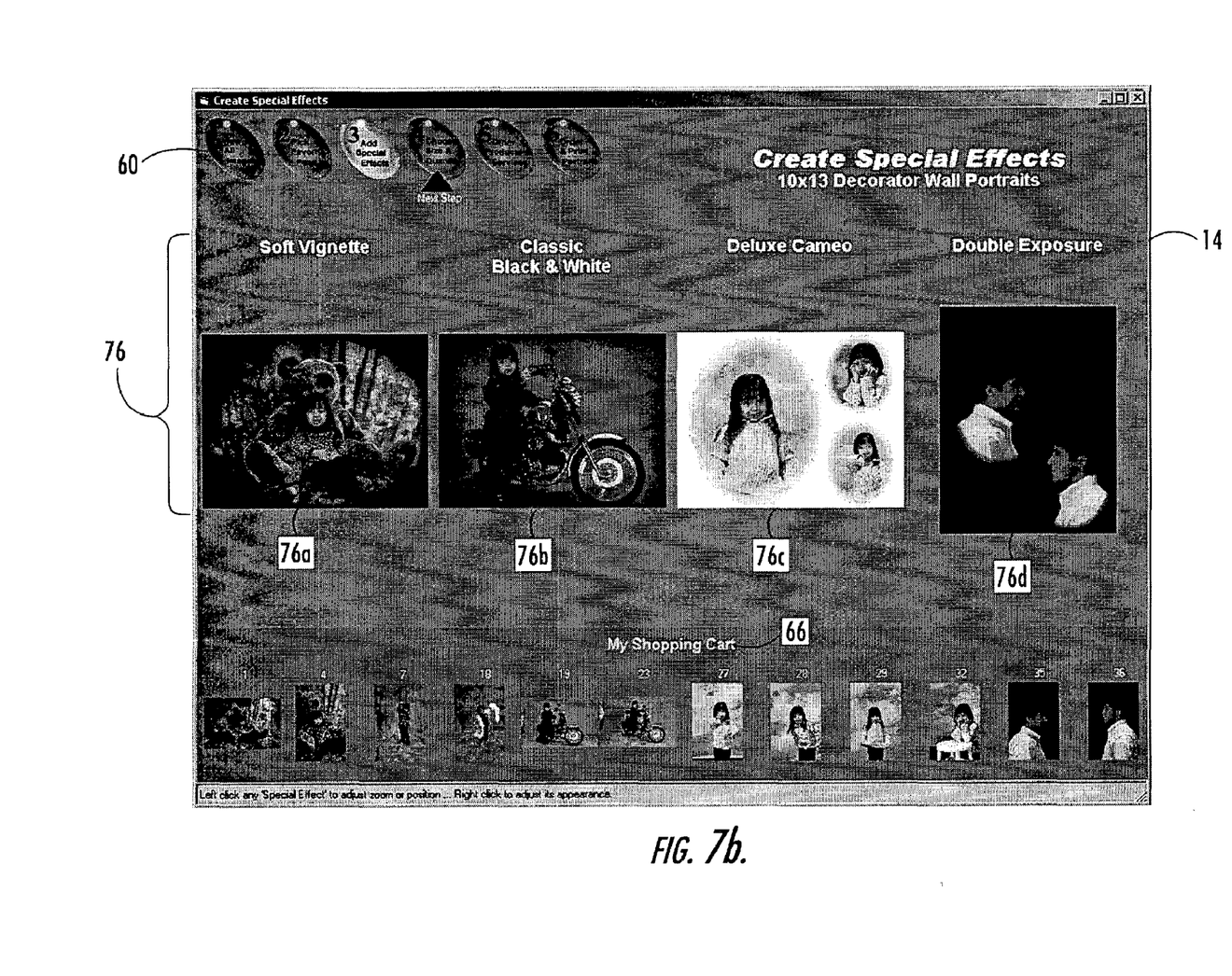

FIG. 7b shows an example of the special effect settings 76 as applied to selected images 62 from the shopping cart 66. The selected images with special effects are then shown, as they will appear in print form, although changes to each special effect setting or the selected image(s) can be changed. In particular, each image could be repositioned within each special effects window and changes can be made to the tone, vignette size, vignette color, sheet size and orientation of the image. More specifically, the tone can be changed between color, black and white and sepia, and the vignette size can be modified from various oval and rectangular, and mist settings. The vignette color can be modified between black, white, various pre-selected colors from a dialogue box, or by selecting a color that is present in the image. The special effects are preferably selected for either 10×13 or 8×10 prints, although the print size can be varied.

As described above, other steps in the portrait process include selecting from various portrait "packages," which may include 10×13, 8×10, 5×7, 3½×5 and wallet size prints. Pricing information may also be included at this step.

The customer may also be allowed to select and modify the size and quantity of the selected images in the shopping cart 66. In particular, all of the selected images from the shopping cart can be displayed on the screen 14, and the quantity of each image can be changed as well as the sheet size.

Other options are also available by selecting a corresponding icon from the location map 60 on the display screen 14. Such other options include, but are not limited to, holiday photo cards, advertised specials, calendars, and the like. Using a holiday card option as an example, a prompt is given for selecting a desired image from the images in the shopping cart 66, as well as a desired holiday greeting. A separate window for greeting cards opens that shows a preview of the selected image and greeting along with pricing information and quantity.

When the desired portrait collection and greeting cards have been selected, the final icon in the location map 60 entitled "Order and Print Portraits" is selected, which in one embodiment opens a window detailing the charges for that particular order. Pursuant to order verification, the finalized selected portrait images (as modified or modified) are prepared and delivered via the LAN 11 to the printer 20 through processing code of the system 10. The sales information is stored in at least one of the studio computers 12 and can also be sent to other locations, such as off-site corporate computers. During this time, the charges for the order are collected from the customer.

Once the images and related data are received at the printer 20, the printer prints the sheets such that the entire process from sending the images to the printer and printing the images is performed within minutes, although delays may occur due to printing capacity at the printer, etc.

While the systems and methods described above utilize a still-frame digital camera, it is also possible that the digital recording device 16 can be a digital video recorder, which is capable of recording multiple poses and facial expressions of a portrait subject(s) in a continuous video stream. Advantageously, the video stream can be broken into a series of individual high-resolution digital images that are equivalent in quality to that offered by still-frame digital cameras. Thus, the customer can select images from the full range of motion, poses, and expression captured by the video stream instead of the 36 or so images captured by the still-frame digital camera. In this regard, the chance of the studio operator missing a candid shot of the subject(s) is eliminated, as the video recorder captures the entire photography or portrait sitting.

The streaming digital video system offers several other advantages. For example, the images taken from the video stream can be modified and customized as described above. Also, the streaming video system described herein uses no film and therefore has no associated film cost. Another advantage is that, in addition to filming subjects using traditional portrait backgrounds and scenes, subjects filmed with the streaming digital video system can be posed with chroma key technology using blue or green backgrounds so that an unlimited number of backgrounds can be combined with the selected images. Chroma key technology can also be used in conjunction with the digital images captured by the digital camera described above.

In one embodiment, the streaming digital video system of the present invention includes a video recorder or camera that is mounted on a tripod or track and can be operated manually by the studio operator and/or automatically by the studio computer. The video camera includes an auto focus lens and a field of view equal to at least the size of the background to ensure that the subject(s) are always inside the area defined by the background. The video camera is capable of producing a video stream with a resolution advantageous for high-quality, close-up cropping of the broken down images without the need for the video camera to zoom during the photography sitting. The video camera also has an aspect ratio conductive to printing standard portrait size sheets.

The video camera preferably stores the video stream in a memory card or the like that can be downloaded or transmitted seamlessly to the studio computer(s). The stream video system also includes software, which includes Active X controls and functions similar to those described above, to view, separate, and select as individual images desired frames from the video stream.

In operation, the video stream is started and stopped by the studio operator at the beginning and end of the session. Accordingly, during the photography sitting the studio operator is then completely free to interact with and guide the subject(s) to create poses and facial expressions instead of operating a camera.

Another aspect of the video system includes synchronization between a video recording device, lighting, and backgrounds. More specifically, in one embodiment the video camera captures a video stream of the subject. During the recording sitting, the lighting system 23 is synchronized or programmed to provide various lighting setting and effects, which are captured in real time by the video camera 16. The background may also be changed during the sitting either manually or automatically. If a chroma key background is used, for example, the background could automatically change one or more times during the sitting and may be synchronized with the lighting system 23 to create a variety of effects and images. It is also possible to synchronize the lighting system and/or backgrounds using still images captured by a digital camera.

It is also possible to capture a video stream with the digital video camera and operate the lighting system 23 according to a predetermined schedule, such as flashes at various intensities, slow rises and fades in intensity, lighting from various angles and positions, etc. In this regard, many different lighting arrangements are then captured on the video stream, and individual video frames or images can then be selected as the portrait images. Advantageously, method allows for slight changes in lighting, position, and pose to be captured so that the customer or studio operator can select the desired images precisely.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of producing digital portraits, comprising:
capturing a plurality of digital images with a digital recording device;
displaying the images in predetermined groups, each of the groups having at least two images;
selecting at least one of the images from at least one of the predetermined groups; and
electronically transmitting the at least one selected image to a digital printer;
wherein said capturing step includes capturing a plurality of images that include images of similar poses and backgrounds, and wherein said displaying step includes displaying the images of similar poses and backgrounds as groups; and
wherein said capturing and displaying steps include capturing 36 images using 4 backgrounds and 12 poses, and displaying the images in groups of 3 having similar backgrounds and poses.

2. A method according to claim 1, wherein the digital printer is maintained by a third-party host.

3. A method according to claim 1, wherein said capturing step includes capturing at least 10 images.

4. A method according to claim 1, further comprising digitally modifying at least one of the images before selecting the image.

5. A method according to claim 1, wherein said transmitting step includes transmitting the images from a computer of a portrait studio to the digital printer of the third-party host.

6. A method of claim 1 further comprising:
transferring the images to a computer after the images are captured.

7. A method according to claim 6, wherein said grouping step includes grouping the plurality of digital images in the order in which they were captured.

8. A method according to claim 6, wherein said grouping step includes grouping the digital images such that each group includes images of the subject in at least one of either similar poses or in similar backgrounds.

9. A method of claim 1 further comprising
visually altering the display screen to indicate selection of the at least one of the digital images; and
adding the at least one selected digital image to an electronic shopping cart.

10. A method according to claim 9, wherein the visually altering step includes altering the display screen to indicate that the digital images other than the at least one selected digital image are unselected.

11. A method according to claim 9, further comprising selecting at least one of the unselected digital images, whereby the display screen is altered to indicate the at least one of the unselected digital images as selected.

12. A method according to claim 9, wherein the visually altering step includes changing the appearance of at least one of the images to allow for visual differentiation between selected and unselected images.

13. A method of claim 1 comprising:
displaying at least one special effects setting on a display screen after displaying the images;
selecting at least one of the digital images for the at least one special effects setting so that the at least one special effects setting is applied to the at least one digital image; and
saving the at least one digital image with the at least one special effects setting applied thereto.

14. A method according to claim 13, wherein the at least one special effects setting is selected from the group consisting of black and white, sepia, vignette, multiple cameo, double exposure, calendar, and greeting card.

15. A method according to claim 13, wherein said digital images displaying step includes displaying a plurality of digital images selected by a customer from a larger group of digital images.

16. A method according to claim 13, wherein said special effects setting displaying step includes displaying a plurality of special effects settings, and wherein said selecting step includes selecting digital images for the corresponding plurality of special effects settings and displaying the selected digital images with the corresponding special effects settings applied thereto.

17. A method according to claim 13, further comprising manipulating at least one of the plurality of the digital images prior to said saving step.

18. A method according to claim 17, wherein said manipulating step includes digitally manipulating at least one of the plurality of digital images, the manipulating selected from at least one of the group consisting of zooming, rotating, flipping, inverting, centering, changing tone, and panning.

* * * * *